United States Patent [19]
Oda

[11] 4,250,528
[45] Feb. 10, 1981

[54] MAGNETIC DISC RECORDING APPARATUS

[75] Inventor: Hiroyasu Oda, Kamakura, Japan

[73] Assignee: Mitsubishi Denki Kabushiki Kaisha, Tokyo, Japan

[21] Appl. No.: 25,101

[22] Filed: Mar. 29, 1979

[30] Foreign Application Priority Data

Apr. 18, 1978 [JP] Japan .................................. 53-45692

[51] Int. Cl.³ .......................... G11B 5/012; G11B 5/60; G11B 5/82
[52] U.S. Cl. .......................................... 360/98; 360/99
[58] Field of Search .................................. 360/97–99, 360/86, 135, 133; 206/444

[56] References Cited

U.S. PATENT DOCUMENTS

| | | | |
|---|---|---|---|
| 3,631,423 | 12/1971 | Groom | 360/97 |
| 3,846,837 | 11/1974 | Jacques | 360/99 |
| 3,981,025 | 9/1976 | Schoettle et al. | 360/99 |
| 4,130,845 | 12/1978 | Kulma | 360/98 |

FOREIGN PATENT DOCUMENTS 2163574  5/1973  Fed. Rep. of Germany ............ 360/98

OTHER PUBLICATIONS

IBM Tech. Disclosure Bulletin, Baffle Construction for Bistable Disk Pack, A. W. Orlando, vol. 19, No. 2, Jul. 1976, pp. 584–585.

Primary Examiner—Alfred H. Eddleman
Attorney, Agent, or Firm—Oblon, Fisher, Spivak, McClelland & Maier

[57] ABSTRACT

A magnetic disc recording apparatus comprises flow control partitions disposed near peripheral parts of rotary magnetic discs whereby air involved between magnetic discs or between magnetic disc groups is controlled.

3 Claims, 3 Drawing Figures (a)

(b)

MAGNETIC DISC RECORDING APPARATUS

BACKGROUND OF THE INVENTION

1. Field of the Invention

The present invention relates to disc recording apparatus comprising a plurality of magnetic discs and floating heads corresponding to the surfaces of the magnetic discs whose safety is improved. More particularly, it relates to prevent abnormal contacts of the floating heads with the magnetic discs caused in sequence by forming a dust caused by the first abnormal contact of the head with corresponding magnetic disc and diffusing the dust on the surfaces of the other magnetic discs.

2. Description of the Prior Arts

FIG. 1 shows a schematic view of a conventional magnetic disc recording apparatus wherein the reference numeral (1) designates a plurality of magnetic discs; (2) designates floating heads which are floating with each gap of about 1 $\mu$m on each corresponding magnetic disc; (3) designates a mechanism for determining positions of the heads at specific tracks on the magnetic disc surfaces; (4) designates an air filter for preventing contamination of a dust in the gap from air fed into the apparatus which causes abnormal contact of the head with the magnetic disc and clean air is fed into an air tightening chamber (5) covering the magnetic discs and the heads.

When the head (2) is abnormally contacted with the surface of the magnetic disc (1) or the head (2) is fallen down on the surface of the magnetic disc (1), a dust caused by the abnormal contact is involved into the spaces on the other magnetic discs as shown by the chain line and the dust is diffused to cause sequentially the abnormal contact or the falling of the heads on the corresponding surfaces of the magnetic discs whereby many magnetic discs and heads are damaged in the apparatus.

SUMMARY OF THE INVENTION

It is an object of the present invention to overcome such disadvantages and to prevent the abnormal contacts of the floating heads with the magnetic discs caused in sequence by forming the dust caused by the first abnormal contact of the head with the corresponding magnetic disc and diffusing the dust on the surfaces of the other magnetic discs.

The foregoing and other objects of the present invention have been attained by providing a magnetic disc recording apparatus which comprises flow control partitions disposed near peripheral parts of the magnetic discs which are rotated whereby air involved between magnetic discs or between magnetic disc groups is controlled.

DETAILED DESCRIPTION OF PREFERRED EMBODIMENTS

Figure 1:
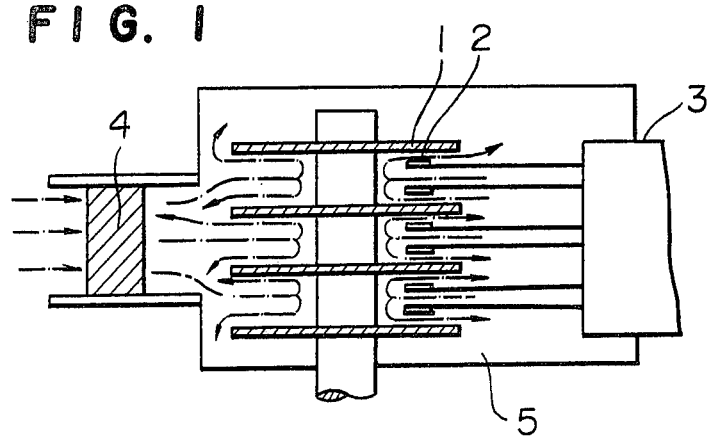
FIG. 1 is a sectional view of a conventional magnetic disc recording apparatus.
Figure 1:
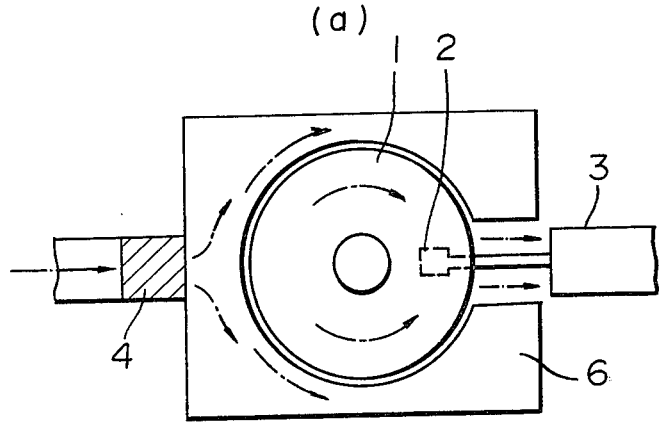

Referring to the drawings, one embodiment of the magnetic disc recording apparatus of the present invention will be illustrated.

Figure 2:
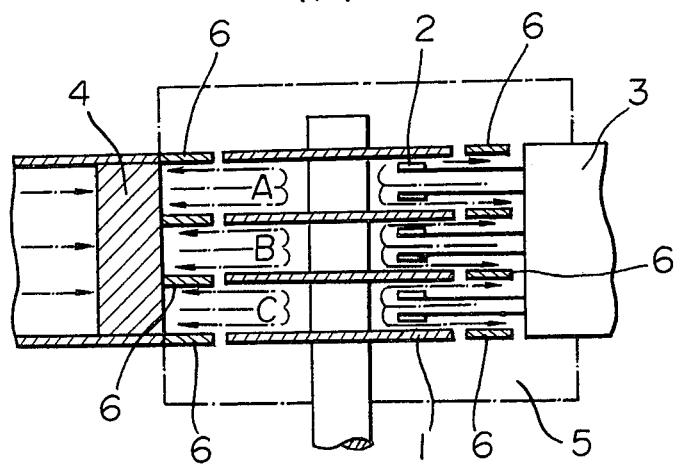
FIG. 2 shows one embodiment of the magnetic disc recording apparatus of the present invention and FIG. 2 (a) is a plan view and FIG. 2 (b) is a sectional view thereof.

FIG. 2 is schematic view of the embodiment of the present invention and FIG. 2 (a) is a plan view and FIG. 2 (b) is a sectional view thereof.

In one embodiment of the present invention shown by FIG. 2, flow control partitions (6) having a thickness being similar to that of the magnetic disc are disposed with each gap being the same with each gap between adjacent magnetic discs near the peripheral parts of the magnetic discs whereby air flow passed to the peripheral parts of the magnetic discs by centrifugal force caused by rotation of the magnetic discs is controlled to prevent the air flow involved between the magnetic discs after blowing against the inner wall of the shroud.

The distance between the peripheral edge of the magnetic disc and the corresponding flow control partition is adjusted to be minimum without contacting them. Air in the spaces A, B and C between the magnetic discs is fed from the inlet and discharged through the outlet so as to minimize pressure differences among the spaces A, B and C.

In the commercially available magnetic disc recording apparatus, the diameter of the magnetic disc is 35 cm and the revolution speed of the disc is 3,600 rpm and the distance between the head and the corresponding magnetic disc (floating distance) is 0.5 to 1 $\mu$m.

Particle diameters of the dust formed by the abnormal contact of the head with the magnetic disc are distributed in a range of 1 to several $\mu$m or more and the dust is involved into the gap between the other head and the corresponding magnetic disc to induce further abnormal contacts.

In accordance with the present invention, the involving of the dust among the spaces A, B and C can be prevented by the flow control partitions. In this embodiment, the flow control partitions are disposed around each of all of the magnetic discs. However, it is possible to disposed the flow control partitions for each of groups of plural magnetic discs depending upon the design.

When a flexible stack superposing many flexible discs is used, the design having the flow control partitions for each group of magnetic discs is preferable.

In FIG. 2 (a) of the plan view, the air tightening chamber (5) is not shown so as to be simplified and to be easily understood the embodiment of the present invention.

As described above, in accordance with the magnetic disc recording apparatus of the present invention, the flow control partitions are disposed to prevent the involving of the dust formed by the abnormal contact on one specific surface of the magnetic disc and so as to prevent further the other abnormal contacts of the other heads with the corresponding magnetic discs caused in sequence.

What is claimed is:

1. A magnetic disc recording apparatus, comprising:
   a plurality of magnetic discs, said discs being rotatably mounted one above another on a rotatable spindle;
   a plurality of magnetic heads for communicating with said discs, said heads floating on said discs;

an air-tight chamber surrounding said plurality of discs and said plurality of magnetic heads;

means for filtering pressurized air entering said chamber;

a plurality of air flow control partitions located within said air-tight chamber, each of said partitions including a circular opening having a diameter slightly larger than the diameter of one of said magnetic discs, said partitions being positioned within said chamber such that each of said partitions is coplanar with one of said discs and such that said circular opening in said partition is concentric with said one of said discs;

wherein air flowing between said plurality of discs is controlled by said partitions, whereby dust particles occurring between any two of said discs are prevented from contaminating the remainder of said plurality of discs.

2. A magnetic disc recording apparatus as recited in claim 1, wherein: one of said plurality of partitions is disposed adjacent to each of said plurality of discs.

3. A magnetic disc recording apparatus as recited in claim 1, wherein: one of said plurality of partitions is associated with a group of said plurality of discs.

* * * * *